United States Patent [19]
Green

[11] Patent Number: 5,797,822
[45] Date of Patent: Aug. 25, 1998

[54] INFINITELY VARIABLE ROTARY DRIVE TRANSMISSION SYSTEM

[76] Inventor: Leroy C. Green, 3120 Unionhill Rd., Marianna, Fla. 32446

[21] Appl. No.: 821,516

[22] Filed: Mar. 21, 1997

[51] Int. Cl.$^6$ ............................................. F16H 15/50
[52] U.S. Cl. ...................................... 475/306; 74/86
[58] Field of Search .............................. 475/306; 74/86

[56] References Cited

U.S. PATENT DOCUMENTS

| | | | |
|---|---|---|---|
| 4,336,724 | 6/1982 | Mize | 475/306 |
| 5,358,459 | 10/1994 | Lin | 475/306 |

*Primary Examiner*—Dirk Wright
*Attorney, Agent, or Firm*—George A. Bode; Lisa D. Charouel; Bode & Associates

[57] ABSTRACT

An infinitely variable rotary drive transmission system which provides a true infinitely variable speed range that begins with zero output and accelerates smoothly and steplessly into the over-drive range, provides limitless horsepower capacity and does not require a clutch mechanism to change speeds. The infinitely variable rotary drive transmission system comprises an input shaft, hub assembly, a plurality of identical differential gear assemblies and a plurality of cam rod assemblies operatively coupled to vary the rotational output velocity of an output shaft.

20 Claims, 3 Drawing Sheets

INFINITELY VARIABLE ROTARY DRIVE TRANSMISSION SYSTEM

BACKGROUND OF THE INVENTION

1. Field of the Invention

The present invention relates to transmission systems and, particularly, to a infinitely variable rotary drive transmission system.

2. General Background

In the past, various types of transmissions have been developed for regulating the power output from various types of motors or engines. Many of the prior transmissions have used mechanical and hydraulic systems in conjunction with a clutch mechanism for regulating the output of the engine or motor. In these conventional transmissions, the use of costly clutches are a necessity. Typically, the operation of such prior transmissions do not produce smooth acceleration. Moreover, such prior devices are often complicated structures which require careful maintenance to remain in satisfactory operating condition.

For example, in most automotive transmissions, shifting occurs in specific, discrete steps between high-torque, low-speed modes for accelerating a vehicle from a stop position and low-torque, high-speed modes for operating a vehicle at highway speeds. In a manual transmission, shifting is typically accomplished by the engagement of gear sets. In an automatic transmission, shifting is typically accomplished by the controlled engagement of friction elements. As a result of the limitations of shifting in discrete steps, the most efficient vehicle operation can only be approximated. Automotive engineers have long recognized that efficiency would be improved if the transmission could be adjusted continuously between ratios in order to compensate for changing conditions. Such continuous adjustment would allow engine operation to approach maximum efficiency for any particular condition.

Accordingly, continuously variable transmissions were developed to increase efficiency. One such continuously variable transmission employs a variable pulley having a pair of flanges mounted on an input shaft with at least one of the flanges axially movable with respect to the other. A flexible belt couples the pulleys to allow the transfer of torque between the shafts when one of the shafts is driven. When the pitch radius of one pulley is changed, the pitch radius of the other pulley is changed simultaneously in the opposite direction. As a result, the drive ratio between the input and output shafts is varied in a continuous, smooth manner within a predetermined speed range.

Many of these prior continuously variable transmissions suffer numerous disadvantages. For example, many have a very limited speed range. Some of the prior transmissions require a clutch mechanism to shift between various speed ranges.

Several transmission systems have been patented which are aimed at continuously variable transmission systems and infinitely variable rotary drive transmission systems.

U.S. Pat. No. 4,505,163 is directed to a continuously variable transmission system requiring a clutch mechanism and operates smoothly only in a predetermined speed range.

U.S. Pat. No. 4,711,139 is directed to an infinitely variable rotary drive transmission system which requires a clutch mechanism and does not provide a true infinitely variable speed range that begins with zero and accelerates smoothly and steplessly into the over-drive range.

U.S. Pat. No. 5,352,162 is directed to an infinitely variable rotary transmission system which requires a complicated hydraulic system.

The known infinitely variable rotary drive transmission systems do not address the need for a infinitely variable rotary drive transmission system which provides true infinitely variable speed range that begins with zero output and accelerates smoothly and steplessly into the over-drive range, provides limitless horsepower capacity and does not require a clutch mechanism to change speeds.

SUMMARY OF THE PRESENT INVENTION

The preferred embodiment of the transmission system of the present invention solves the aforementioned problems in a straightforward and simple manner. What is provided is an infinitely variable rotary drive transmission system which provides true infinitely variable speed range that begins with zero output and accelerates smoothly and steplessly into the over-drive range, provides limitless horsepower capacity and does not require a clutch mechanism to change speeds.

In operation the infinitely variable rotary drive transmission system comprises an input shaft, hub assembly, identical differential gear assemblies, and rod assemblies operatively coupled for varying the rotational output velocity of an output shaft.

In view of the above, an object of the present invention to provide an infinitely variable rotary drive transmission system which can be either a manual transmission or an automatic transmission and always maintains a positive connection between the input and output shafts.

Another object of the present invention is to provide an infinitely variable rotary drive transmission system constructed primarily from standard parts and requires low maintenance.

In view of the above objects it is a feature of the present invention to provide infinite torque multiplication in the low speed range and infinite speed multiplication in the high speed range.

Other objects and salient features of this invention will become apparent from this disclosure.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
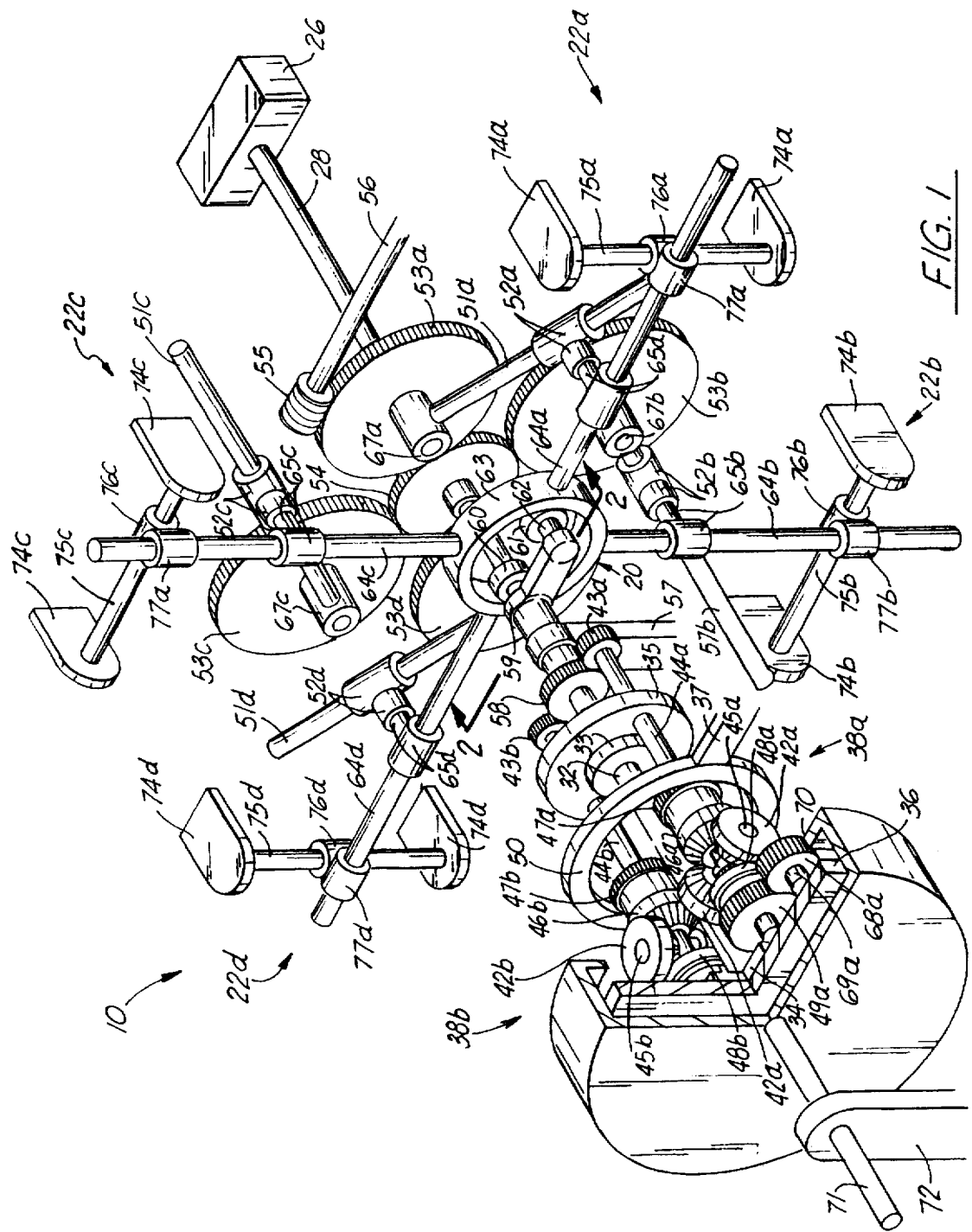
FIG. 1 illustrates a perspective view of the preferred embodiment of the infinitely variable rotary drive transmission system of the present invention.

Referring now to the drawing, and in particular FIG. 1, the infinitely variable rotary transmission system of the present invention is designated generally by the numeral 10. In the exemplary embodiment, the infinitely variable rotary transmission system comprises an input shaft 28, hub assembly 20, two identical differential gear assemblies 38a and 38b and four rod assemblies 22a, 22b, 22c and 22d and an output shaft 71. The two identical differential gear assemblies 38a and 38b, as illustrated, are spaced approximately one hundred eighty degrees apart and concentric with the axis of input shaft 28. Although the preferred embodiment illustrates two identical differential gear assemblies, one or a plurality of differential gear assemblies equally spaced about the input shaft 28 may be utilized.

Power is initially inputted into the infinitely variable rotary drive transmission system 10 via a power source or motor 26 operatively coupled, in a conventional manner, to one end of input shaft 28. The other end of input shaft 28 is rotatably coupled to output shaft 71 such that the axis of output shaft 71 is a prolongation of the axis of input shaft 28. Furthermore, input shaft 28 and output shaft 71 rotate independently of the other. An elongated hollow tubular member 32 is fixedly mounted on input shaft 28. Tubular member 32 includes two identical flanged extremities 33 and 34 fixedly mounted thereon. Two circular plates 35 and 36 (not necessarily identically sized) are fixedly coupled by conventional means (such as cap screws (not shown)) to flanged extremity 33 and flanged extremity 34, respectively, and axes of circular plates 35 and 36 are parallel coupled about input shaft 28.

The combination of tubular member 32, flanged extremities 33 and 34, and plates 35 and 36 is hereafter referred to as the differential assembly carrier. The differential assembly carrier is fixedly coupled to input shaft 28 for spinning differential gear assemblies 38a and 38b in a plane perpendicular to the axis of input shaft 28.

Differential gear assemblies 38a and 38b comprise spider shafts 44a and 44b, spider shaft drive gears 43a and 43b, differential beveled pinion gear pairs 42a and 42b, differential pinion shafts 45a and 45b, first bevel gears 46a and 46b, first end gears 47a and 47b, second bevel gears 48a and 48b and two second end gears (only 49a illustrated), respectively.

Spider shafts 44a and 44b are fixedly coupled to spider shaft drive gears 43a and 43b, respectively; and, further, rotatably coupled to first end gears 47a and 47b, respectively. Spider shaft drive gears 43a and 43b are operatively coupled to or meshed with drive crank gear 58. Drive crank gear 58 is rotatably mounted on input shaft 28. Additionally, spider shafts 44a and 44b are rotatably supported through junctures of circular plate 35 whereby the axis of spider shafts 44a and 44b are parallel to the axis of input shaft 28.

Spider shafts 44a and 44b are further coupled to first end gears 47a and 47b, respectively. First end gears 47a and 47b are fixedly coupled to first bevel gears 46a and 46b, respectively, whereby as first end gears 47a and 47b rotate first bevel gears 46a and 46b rotate accordingly. Second bevel gear 48a is fixedly coupled to second end gear 49a whereby as second bevel gear 48a rotates second end gear 49a rotates accordingly. Second bevel gear 48b is fixedly coupled to its associated second end gear (not shown) and functions to rotate in a like wise manner.

Furthermore, spider shafts 44a and 44b are fixedly coupled to differential shafts 45a and 45b, respectively, in such a manner that the axes of spider shafts 44a and 44b perpendicularly bisect the axes of differential shafts 45a and 45b, respectively. Spider shafts 44a and 44b as coupled to differential shafts 45a and 45b, respectively, are rotatably supported by upper plate 36, whereby spider shafts 44a and 44b maintain their axes parallel to the axis of input shaft 28 and differential shafts 45a and 45b are perpendicular to input shaft 28.

Identical differential beveled pinion gear pairs 42a and 42b are rotatably mounted on opposite ends of differential shafts 45a and 45b, respectively. First bevel gears 46a and 46b and second bevel gears 48a and 48b are meshed with differential beveled pinion gear pairs 42a and 42b, respectively, as illustrated in FIG. 1.

The output of the infinitely variable rotary drive transmission system 10 includes two identical idler gears (only 68a illustrated) and two idler gear shafts (only 69a illustrated). Further included are internal gear 70, output shaft 71 and bearing block 72.

Idler gear 68a is operatively coupled or meshed with second end gear 49a for transmitting power from second end gear 49a to internal gear 70. Accordingly, shaft 69a of idler gear 68a is fixedly mounted to one side of circular plate 36 while its free end has idler gear 68a rotatably mounted thereon. The other idler gear and associated idler gear shaft (not shown) identical to idler gear 68a and idler gear shaft 69a, respectively, function in a like wise manner. The two identical idler gear shafts (only 69a illustrated) are mounted one hundred eighty degrees apart and located at equal distance from the axis of input shaft 28 whereby the longitudinal axes of said idler gear shafts are parallel to the longitudinal axis of input shaft 28.

Output shaft 71 is rotatably mounted on bearing block 72. Bearing block 72 is fixedly mounted to the transmission housing (not shown).

Internal gear 70 is fixedly mounted onto output shaft 71 concentric with the common axis of output shaft 71 and input shaft 28. Internal gear 70 is operatively coupled or meshed with the two identical idler gears (only 68a illustrated).

First end gears 47a and 47b are operatively coupled to or meshed with stationary ring gear 50. Stationary ring gear 50 is concentric about the axis of input shaft 28 and fixedly mounted to transmission housing (not shown) via mounting extremities 37.

Figure 2:
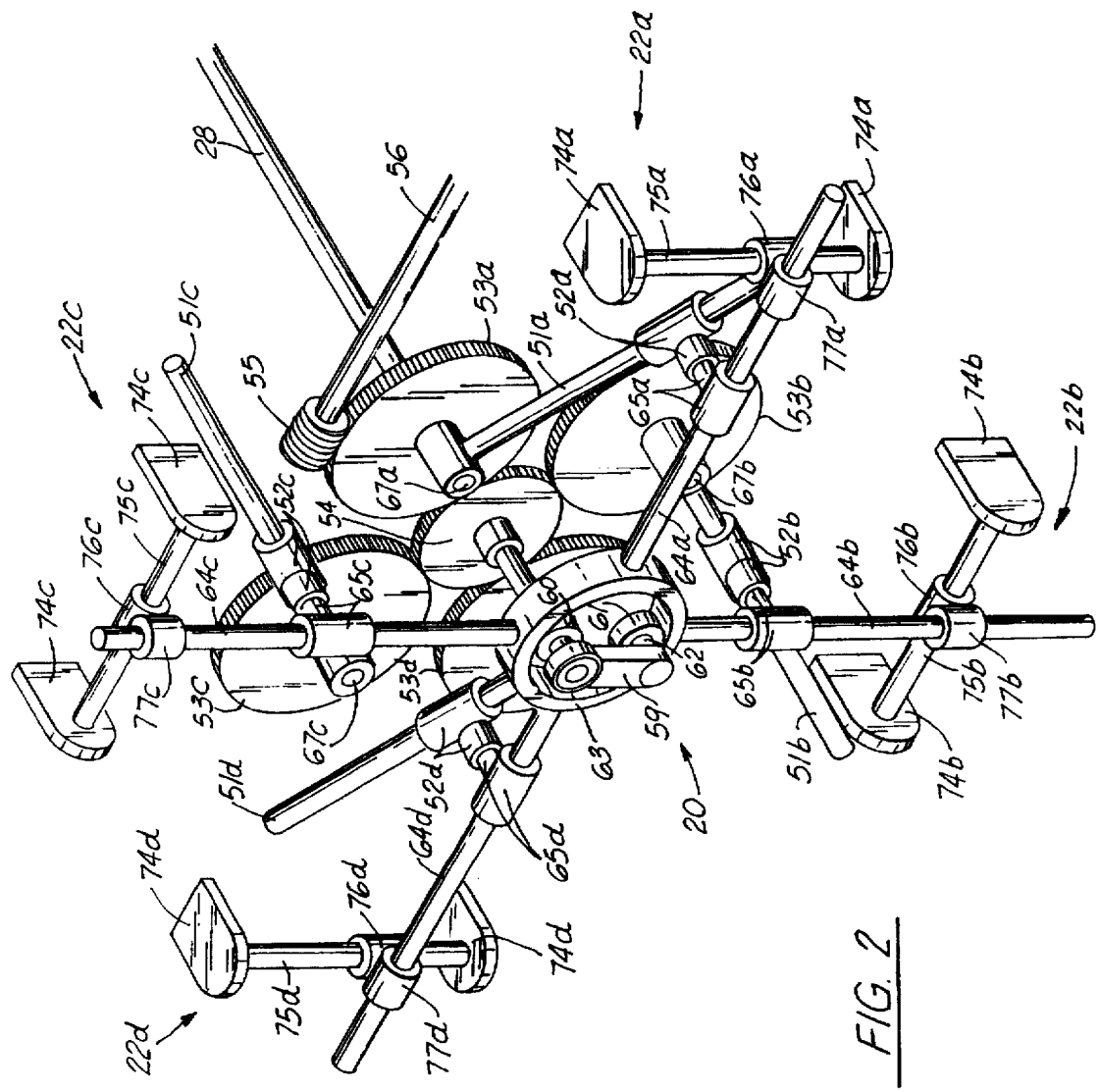
FIG. 2 illustrates a perspective view of the cam assembly of the embodiment of FIG. 1; and, FIG. 3 illustrates a perspective view of an alternate embodiment of the infinitely variable rotary drive transmission system of the present invention.

FIG. 1 and FIG. 2 illustrates hub assembly 20 and rod assemblies 22a, 22b, 22c and 22d of the preferred embodiment. Hub assembly 20 includes a non-spinning hub 63, crank 59, eccentric crank roller 61, crank shaft 62, and guide roller 60. Non-spinning hub 63 is a hollowed ring shaped member whereby input shaft 28 passes therethrough. The axis of non-spinning hub 63 is maintained at a constant radius, eccentric to and parallel to the longitudinal axis of input shaft 28. The non-spinning hub 63 further comprises guide roller 60 which is rotatably mounted on input shaft 28 for maintaining a rolling contact with the inner rim of non-spinning hub 63 and eccentric crank roller 61. The inside diameter of non-spinning hub 63 is slightly greater than the distance between the farthest points on the circumferences of eccentric crank roller 61 and guide roller 68. Non-spinning hub 63 is slidably mounted to eccentric crank roller 61 which revolves in contact with the inner rim of non-spinning hub 63. Additionally, eccentric crank roller 61 rotatably couples to roller shaft 62 having its axis parallel to input shaft 28. Crank 59 is fixedly coupled to roller shaft 62 and drive crank gear 58 whereby as drive crank gear 58 rotates crank 59 rotates accordingly.

Each of rod assemblies 22a, 22b, 22c and 22d comprises a respective one of a plurality of radially aligned and equiangularly spaced arms 64a, 64b, 64c and 64d and sleeves 65a, 65b, 65c and 65d slidably coupled thereto for providing longitudinal movement thereon. Radial arms 64a, 64b, 64c and 64d are fixedly mounted onto non-spinning hub 63, each extending in opposite directions of the axis of non-spinning hub 63. The combination of radial arms 64a, 64b, 64c and 64d as slidably coupled to sleeves 65a, 65b, 65c and 65d, respectively, is hereafter referred to as convertor assemblies.

Each of rod assemblies 22a, 22b, 22c and 22d further comprises cam rods 51a, 51b, 51c and 51d, cam followers 52a, 52b, 52c, and 52d slidably coupled thereon, respectively, and pivot shafts 67a, 67b, 67c and 67d. The combination of cam rods 51a, 51b, 51c and 51d as coupled to cam followers 52a, 52b, 52c and 52d and pivot shafts 67a, 67b, 67c and 67d, is hereafter referred to as cam rod assemblies. Cam followers 52a, 52b, 52c and 52d are further pivotably coupled perpendicularly to sleeves 65a, 65b, 65c and 65d, respectively, whereby cam followers 52a, 52b, 52c and 52d pivotally and slidably couple to cam rods 51a, 51b, 51c and 51d, respectively, about the perpendicular coupling to sleeves 65a, 65b, 65c, 65d, respectively.

Cam rods 51a, 51b, 51c and 51d are elongated members, preferably of equal length. One end of each of the cam rods 51a, 51b, 51c and 51d is fixedly coupled to pivot shafts 67a, 67b, 67c and 67d, respectively. Pivot shafts 67a, 67b, 67c and 67d are rotatably mounted to the transmission housing (not shown) and equiangularly spaced about the axis of input shaft 28. The axes of pivot shafts 67a, 67b, 67c and 67d are parallel to the axis of input shaft 28, such that cam rods 51a, 51b, 51c and 51d pivot in a plane perpendicular to the axis of input shaft 28.

Said cam rod assemblies and said convertor assemblies operate together to vary the output speed and torque produced by motor or power source 26 whereby the convertor assemblies transform the rotary motion of a crank 59 into alternating, overlapping cycles of reciprocating motion and the cam rod assemblies provide continuous resistance to said reciprocating motion and thus to the rotary motion of crank 59. Hence, the convertor assemblies operate with the cam rod assemblies to provide continuous, uniform resistance to the rotation of crank 59.

All the convertor assemblies have in common drive crank gear 58 which receives rotary motion from the orbit of said differential assembly carrier about the axis of input shaft 28, crank 59 to which the rotary motion of drive crank gear 58 is transmitted therebetween, guide roller 60 rotatably mounted on input shaft 28 and non-spinning hub 63.

The slope of cam rods 51a, 51b, 51c and 51d are controlled by end gears 53a, 53b, 53c and 53d, adjustment gear 54, worm gear 55 and worm-gear shaft 56.

End gears 53a, 53b, 53c and 53d are of equal diameter and are fixedly mounted on pivot shafts 67a, 67b, 67c and 67d, respectively. In operation, as end gears 53a, 53b, 53c and 53d turn, pivot shafts 67a, 67b, 67c, and 67d must turn, respectively. Adjustment gear 54 is rotatably mounted on input shaft 28 and operatively coupled to or meshed with end gears 53a, 53b, 53c and 53d and worm gear 55. End gears 53a, 53b, 53c and 53d are assembled with cam rods 51a, 51b, 51c and 51d, respectively, at the same slope or angle of inclination relative to their radial projection from the axis of input shaft 28 to the axes of pivot shafts 67a, 67b, 67c and 67d, respectively.

Worm gear 55 is fixedly mounted onto one end of shaft 56. The opposite end of worm gear shaft 56 is coupled to a power source (not shown) for the manual or automatic rotation of worm gear 55 about its longitudinal axis. Bearing block 57 is fixedly mounted to the transmission housing (not shown). Rotation of shaft 56 causes worm gear 55 to turn end gear 53a, thereby turning adjustment gear 54. Turning adjustment gear 54 causes end gears 53a, 53b, 53c and 53d to turn equal amounts, thereby changing the slope or angle of inclination of cam rods 51a, 51b, 51c and 51d by equal amounts, respectively.

The support for non-spinning hub 63 comprises mounting block pairs 74a, 74b, 74c and 74d, guide rods 75a, 75b, 75c and 75d, first guides 76a, 76b, 76c and 76d, and second guides 77a, 77b, 77c and 77d.

Guide rods 75a, 75b, 75c and 75d are oriented perpendicular to the orientation of radial arms 64a, 64b, 64c and 64d, respectively, and coupled thereto whereby guide rods 75a and 75d as coupled to radial arms 64a and 65d, respectively, are parallel to each other and guide rods 75b and 75c as coupled to radial arms 64b and 65c, respectively, are parallel to each other. Each distal end of guide rods 75a, 75b, 75c and 75d are fixedly coupled to a respective one of mounting block pairs 74a, 74b, 74c and 74d. The mounting block pairs 74a, 74b, 74c and 74d are fixedly coupled to the transmission housing (not shown). Accordingly, guide rods 75a, 75b, 75c and 75d are stationary and spaced apart from the transmission housing.

First guides 76a, 76b, 76c and 76d are hollow tubular members slidably coupled to guide rods 75a, 75b, 75c and 75d, respectively, for longitudinal movement thereon. Second guides 77a, 77b, 77c and 77d are rigidly coupled to first guides 76a, 76b, 76c and 76d, respectively, such that the longitudinal axes of second guides 77a, 77b, 77c and 77d are at right angles and preferably midway the longitudinal axis of first guides 76a, 76b, 76c and 76d, respectively. The free ends of radial arms 64a, 64b, 64c and 64d extend in the opposite direction of the axis of non-spinning hub 63 to slidably engage second guides 77a, 77b, 77c and 77d, respectively, for reciprocating movement therethrough.

Radial arms 64a and 64d and radial arms 64b and 64c form first and second radial arm pairs whereby the rigid coupling of second guides 77a, 77b, 77c and 77d to first guides 76a, 76b, 76c and 76d and the slidably coupling of first guides 76a, 76b, 76c and 76d to guide rods 75a, 75b, 75c and 75d, enable non-spinning hub 63 and said first and second radial arms pairs to be shifted in a direction perpendicular to the longitudinal axis of input shaft 28, while said radial arm pairs remain aligned perpendicular to their respective guide rods 75a, 75b, 75c and 75d.

The coupling of sleeves 65a, 65b, 65c and 65d to cam followers 52a, 52b, 52c and 52d, respectively, and the slidably coupling of arms 64a, 64b, 64c and 64d to second guides 77a, 77b, 77c and 77d, respectively, restrict non-spinning hub 63 to non-rotational movement parallel to the plane of rotation of eccentric crank roller 61 by constraining each of radial arms 64a, 64b, 64c and 64d; henceforth, maintaining alignment parallel to their original orientation. In general, as eccentric crank roller 61 moves in the direction perpendicular to the orientation of said first radial arm pair it move in the direction parallel to the orientation of said second radial arm pair.

The diameter of non-spinning hub 63 is less than the diameter of crank 59. As crank roller 61 rotates against the inner rim of non-spinning hub 63, non-spinning hub 63 is forced away from eccentric crank roller 61 whereby the movement of the axis of non-spinning hub 63 circumscribes a circle of constant radius about the axis of input shaft 28 and the direction of said movement at any point during a cycle, is parallel to the direction of movement of eccentric crank roller 61. The direction of movement of non-spinning hub 63 and radial arms 64a, 64b, 64c and 64d, in relationship to the orientation of cam rods 51a, 51b, 51c and 51d, causes cam followers 52a, 52b, 52c and 52d to reciprocate longitudinally on cam rods 51a, 51b, 51c and 51d, respectively.

Each of radial arms 64a, 64b, 64c and 64d, when reciprocating, maintains its original orientation perpendicular to guide rods 75a, 75b, 75c and 75d to which it is coupled. Because radial arms 64a and 64d extend in opposite direction from each other their reciprocating movement must be in the same direction. Likewise, the reciprocating movement of radial arms 64b and 64c must be in the same direction in accordance with their direction of movement. Cam followers 52a and 52d as coupled to radial arms 64a and 64d, respectively, begin and end their strokes simultaneously, but move in opposite directions relative to their respective pivot shafts 67a and 67d. In other words, when cam follower 52a moves towards its pivot shaft 67a, cam follower 52d moves opposite its pivot shaft 67d. Cam followers 52b and 52c as coupled to radial arms 64b and 64c begin and end their strokes in a likewise manner in accordance with their direction of movement.

Specifically, cam follower 52a begins its stroke as eccentric crank roller 61 moves in the direction parallel to the orientation of its respective radial arm 64a to which cam rod 51a is coupled thereto and continues to the mid point of the stroke, at which time the eccentric crank roller 61 is moving in the direction perpendicular to the orientation of radial arm 64a. The balance of the stroke corresponds to eccentric crank roller 61 continuing to the point at which its movement is again parallel to the direction of orientation of radial arm 64a. Cam followers 52b, 52c and 52d begin their stroke in a likewise manner in accordance with the movement of eccentric crank roller 61 with respect to their corresponding radial arms 64b, 64c and 64d.

Each of the longitudinal axes of each of radial arms 64a, 64b, 64c and 64d and its respective sleeves 65a, 65b, 65c and 65d is oriented in the same direction as the direction of each of radial arms 64a, 64b, 64c and 64d. In accordance with the direction of movement of eccentric crank roller 61, radial arms 64a, 64b, 64c and 64d move in the direction parallel to its respective longitudinal axis, and move freely through sleeve 65a, 65b, 65c and 65d, respectively. Accordingly, no force is applied to cam rods 51a, 51b, 51c and 51d by means of the pivotal and slidable coupling of cam followers 52a, 52b, 52c and 52d, respectively, about the perpendicular coupling to sleeves 65a, 65b, 65c, 65d, respectively. Consequently, there is no resistance to the movement of radial arms 64a, 64b, 64c and 64d or to the rotation of eccentric crank roller 61. As the direction of movement of radial arms 64a, 64b, 64c and 64d changes from parallel to perpendicular to its respective longitudinal axis, the forces exerted on sleeves 65a, 65b, 65c and 65d in the direction perpendicular to the longitudinal axis of arms 64a, 64b, 64c and 64d, respectively, increases from zero to a maximum as does the resistance provided by cam rods 51a, 51b, 51c and 51d in reaction to these forces and the rotation of eccentric crank roller 61.

As cam rods 51a, 51b, 51c and 51d are adjusted to zero slope or angle of inclination, there is no resistance to the reciprocating movement of cam followers 52a, 52b, 52c and 52d, respectively, because each of cam rods 51a, 51b, 51c and 51d is oriented in a direction perpendicular to it respective radial arm. Thus, the amplitude of the component of the stroke of each of the cam followers 52a, 52b, 52c and 52d in the direction parallel to the orientation of its respective radial arm to which is coupled is zero. Furthermore, the amplitude of the stroke of each of the cam followers 52a, 52b, 52c and 52d parallel to the orientation of its respective cam rod and the component of its stroke perpendicular to the respective radial arm to which the cam rod is coupled, are the same.

The magnitude of the resistance to the reciprocation of each of cam followers 52a, 52b, 52c and 52d increases as the slope or angle of inclination of its respective cam rod increases, because the amplitude of the component of its stroke parallel to the orientation of its respective radial arm which it is coupled, increases. Thus, the amplitude of its stroke parallel to the orientation of its respective cam rod increases, while the component of its stroke in the direction perpendicular to it respective radial arm, remains constant.

The distance of eccentric crank roller 61 from each of cam rods 51a, 51b, 51c and 51d which provides resistance to its movement is different at each point along the cycle of eccentric crank roller 61. By spacing first pivot shaft pair 67a and 67d and second pivot shaft pair 67b and 67c one hundred eighty degrees about the axis of input shaft 28, each respective cam rod pair of each pivot shaft pair remains oriented in parallel directions. Additionally, each respective radial arm pair to which its respective cam rod pair is coupled, extends in opposite directions from the axis of non-spinning hub 63. Consequently, at each point in the cycle of eccentric crank roller 61, the amount of resistance provided by parallel cam rods 51a and 51d and parallel cam rods 51b and 51c, is proportional to their distance from eccentric crank roller 61.

The forces exerted on one of said radial arms in reaction to the resistance provided by its respective cam rod to which it is coupled, is balanced by the forces exerted on the other radial arms in reaction to the resistance provided by the respective cam rods of said other radial arms. Accordingly, resistance may be intermittent or continuous.

By orientating the radial arms 64a, 64b, 64c and 64d, as illustrated in FIG. 1, the cycle of the first cam follower pair 52a and 52d with respect to the second cam follower pair 52b and 52c is staggered, so that when cam followers 52a and 52d of parallel cam rods 51a and 51d are midway their stroke provides maximum resistance. Accordingly, cam followers 52b and 52c of parallel cam rods 51b and 51c are in one of the two dead spots of their respective cycles and provides no resistance. At any other point during the cycle of eccentric crank roller 61, the total resistance of rod assemblies 22a, 22b, 22c and 22d is the sum of the resistances provided by all cam rods 51a, 51b, 51c and 51d, simultaneously.

The following description will be referring to the synchronized operation of the infinitely variable rotary drive transmission system of the preferred embodiment of the present invention as illustrated in FIG. 1.

Power is initially inputted to transmission system 10 via input shaft 28. The application of power to input shaft 28 causes input shaft 28 and said differential assembly carrier to rotate.

When the rotation of drive crank gear 58 is less than the rotational velocity of input shaft 28, spider shaft drive gears 43a and 43b turn against drive crank gear 58 thereby spinning spider shafts 44a and 44b, respectively. Accordingly, first end gears 47a and 47b turn against stationary ring gear 50 thereby turning fixedly coupled first bevel gears 46a and 46b, respectively. As first bevel gears 46a and 46b turn, differential beveled pinion gear pairs 42a and 42b meshed with first bevel gears 46a and 46b, respectively, orbit the axes of first spider shafts 44a and 44b, respectively.

The rotational power of first bevel gears 46a and 46b is transmitted to second bevel gears 48a and 48b and fixedly coupled second end gears (only 49a illustrated), respectively, via differential beveled pinion gear pairs 42a and 42b. The rotational velocity of spider shafts 44a and 44b and the rotational velocity of first bevel gears 46a and 46b as coupled to first end gears 47a and 47b, respectively, determines the speed and torque transmitted to second bevel gears 48a and 48b as coupled to second end gears (only 49a illustrated), respectively, via differential beveled pinion gears 42a and 42b, respectively. The rotational speed of first bevel gears 46a and 46b as fixedly coupled to first end gears 47a and 47b, respectively, is determined by the input to input shaft 28. However, the rotational speed of spider shafts 44a and 44b is determined by the total resistance provided by rod assemblies 22a, 22b, 22c and 22d, as described above. Rod assemblies 22a, 22b, 22c and 22d varies its total resistance to the rotation of spider shafts 44a and 44b as coupled to spider shaft drive gears 43a and 43b via its coupling to crank drive gear 58 through crank 59.

Increasing the total resistance provided by rod assemblies 22a, 22b, 22c and 22d increases the rotational velocity of spider shaft drive gears 43a and 43b and thus the rotational speed of output shaft 71. Conversely, decreasing the total resistance provided by rod assemblies 22a, 22b, 22c and 22d decreases the rotational velocity of spider shaft drive gears 43a and 43b resulting in a decrease in the rotational speed of output shaft 71.

When the total resistance provided by rod assemblies 22a, 22b, 22c and 22d is zero, then the rotational speed of spider shafts 44a and 44b and output shaft 71 is zero.

Because of the total resistance provided by rod assemblies 22a, 22b, 22c and 22d to the rotation of spider shafts 44a and 44b, the rotational velocity of second bevel gears 48a and 48b as fixedly coupled to second end gears (only 49a illustrated), respectively, is greater than the rotational velocity of first bevel gears 46a and 46b as fixedly coupled to 47a and 47b, respectively. The additional rotation of second end gears (only 49a illustrated) is transmitted to internal gear 70 via idler gears (only 69a illustrated) thereby causing internal gear 70 and fixedly mounted output shaft 71 to rotate in the direction opposite input shaft 28.

The cam rod angles or slopes of inclination for any given output load determines the magnitude of the total resistance to the rotation of crank 59. For a constant load, increasing the cam angle or slope increases the total resistance to the rotation of crank 59 while decreasing the cam angle or slope decreases the resistance to the rotation of crank 59.

When the total resistance provided by rod assemblies 22a, 22b, 22c and 22d to the rotation of eccentric crank roller 61 is zero, spider shafts 44a and 44b does not rotate because the angular velocities of said differential assembly carrier, crank 59 and spider shaft drive gears 43a and 43b, are equal. The rotational velocity of second end gears (only 49a illustrated) as fixedly coupled to 48a and 48b, respectively, is therefore the same as that of first bevel gears 46a and 46b and first end gears 47a and 47b, but in the reverse direction. Consequently, the velocity of internal gear 70 is zero, as the rotation of second bevel gears 48a and 48b, as coupled to second end gears (only 49a illustrated) is reversed around idler gears 68a and 68b.

When the total resistance provided by rod assemblies 22a, 22b, 22c and 22d retards the rotation of crank 59 to the extent that the angular velocity of drive crank gear 58 is less than equal, but more than half the angular velocity of said differential assembly carrier, then the angular velocity of spider shafts 44a and 44b is less than half that of first end gears 47a and 47b as couple to first bevel gears 46a and 46b, respectively, and the angular velocity of second end gears (only 49a illustrated as coupled to second bevel gears 48a and 48b, respectively, is greater than equal, but less than twice that of first end gears 47a and 47b as coupled to first bevel gears 46a and 46b, respectively. Consequently, the velocity of output shaft 71 is greater than zero, but less than the velocity of input shaft 28.

When the total resistance provided by rod assemblies 22a, 22b, 22c and 22d retards the rotation of crank 59 to the extent that the angular velocity of drive crank gear 58 is less than half the angular velocity of said differential assembly carrier, then the angular velocity of spider shafts 44a and 44b is more than half that of the first end gears 47a and 47b as coupled to first bevel gears 46a and 46b, respectively, and the angular velocity of the second end gears (only 49a illustrated) as coupled to second bevel gears 48a and 48b, respectively, is more than twice that of first end gears 47a and 47b as coupled to first bevel gears 46a and 46b, respectively. Consequently, the velocity of output shaft 71 is greater than the angular velocity of input shaft 28.

The infinitely variable rotary drive transmission system 10 compensates for output speeds that are below input speeds by proportional decreases in output torque and for output speeds above input speeds, by proportional decrease in output torque.

As with a typical differential gear assembly, differential gear assemblies 38a and 38b each have two inputs which determine the output of a shaft. The relationship between the velocities of the inputs to the shaft can be generalized as a+b=2c, where (a) equals the angular velocity of first end gears 47a or 47b as fixedly coupled to first bevel gear 46a or 46b, respectively, (b) equals the output velocity of second end gears (only 49a illustrated) as fixedly coupled to 48a or 48b, respectively, and © equals the angular velocity of spider shafts 44a or 44b.

Figure 3:
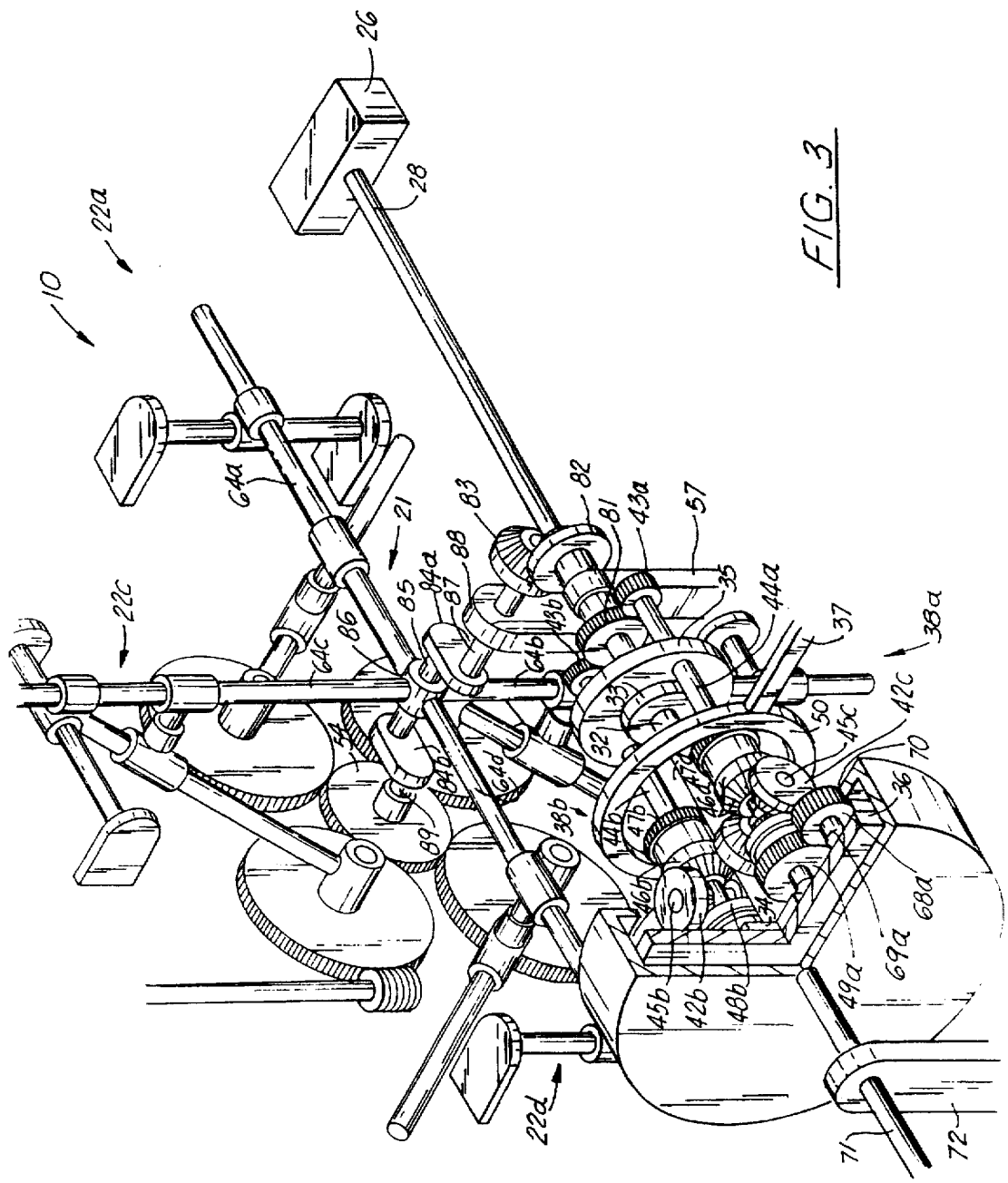

FIG. 3 illustrates an alternative embodiment of the present invention. The infinitely variable rotary transmission system comprises a hub assembly 21, two identical differential gear assemblies 38a and 38b and four rod assemblies 22a, 22b, 22c and 22d. As illustrated, the hub assembly of the present invention has been modified. Hub assembly 21 comprises two identical parallel crank arms 84a and 84b each having one end rotatably mounted onto hub shaft 85 which extends through the center of hub 86. The other end of parallel crank arms 84a and 84b, extending in the same direction, each have one end fixedly mounted onto shaft 85 and shaft 87, respectively, whereby the axis of shaft 87 is angled with respect to the axis of input shaft 28 and output shaft 71. Shaft 87 couples to first beveled gear 83 which couples to or meshes with second beveled gear 82 rotatably mounted onto input shaft 28.

Hub shaft 85 is fixedly mounted between crank arms 84a and 84b such that its axis is parallel and eccentric to the axes of shafts 87 and 89. Hub 86 is rotatably mounted on eccentric shaft 85 and one extremity of each radially aligned arms 64a, 64b, 64c and 64d is fixedly mounted thereto. Shaft 87 is fixedly mounted onto mounting block 88 which is fixedly mounted onto the transmission housing (not shown) on the opposite side of gear 54. Control gear 54 is rotatably mounted to shaft 89 which is fixedly mounted to the transmission housing (not shown) whereby its axis is aligned with the axis of shaft 87.

Second beveled gear 82 is fixedly coupled to gear 81 whereby as second beveled gear 82 rotates, gear 81 rotates accordingly.

The alternate embodiment is operable in the same manner as the preferred embodiment, except that in the converter assembly of the alternate embodiment, crank assembly 21 is geared rather than fixed to crank gear 81 by means of bevel gear 82 meshed with bevel gear 83, thereby as crank gear 81 rotates, parallel crank arms 84a and 84b are driven by, rather than rotate with, crank gear 81.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An infinitely variable rotary drive transmission system for regulating a power output from a motor, said infinitely variable rotary drive transmission system comprising:
   (a) non-spinning hub means coupled to a plurality of radial arm means extending radially outwardly therefrom and spaced thereon for controlling a crank rotation;
   (b) a plurality of differential gear assembly means spaced symmetrically about and concentric with an axis of an input shaft for controlling rotational speed of an output shaft;
   (c) a plurality of cam rod means each pivotally coupled to a respective one of a plurality of gear means for providing a plurality of resistances;
   (d) a plurality of cam follower means each slidably coupled to a respective one of said plurality of cam rod means and pivotally coupled to a respective one of said plurality of radial arm means for controlling a slope of inclination for each of said respective one of said plurality cam rod means; and,
   (e) a plurality of support means for supporting a respectively one of said plurality of radial arm means and for maintaining the original alignment of each of said plurality of radial arm means parallel to its original orientation.

2. The infinitely variable rotary drive transmission system of claim 1, wherein each of said plurality of support means comprises:
   (i) a guide rod perpendicular to each said respective one of said plurality of radial arm means;
   (ii) mounting block pairs coupled to distal ends of said guide rod;
   (iii) first guide slidably coupled to said guide rod; and,
   (iv) second guide rigidly coupled to said first guide and slidably coupled to said respective one of said plurality of radial arm means.

3. The infinitely variable rotary drive transmission system of claim 1, wherein said non-spinning hub means is a hollowed ring shaped member having said input shaft pass therethrough and an axis of said non-spinning hub means is maintained at a constant radius, eccentric to and parallel to a longitudinal axis of said input shaft.

4. The infinitely variable rotary drive transmission system of claim 1, wherein said non-spinning hub means couples to two parallel crank arms, one of said two parallel crank arms couples to a first hub shaft, and said first hub shaft couples to a first beveled crank gear and said first beveled crank gear meshes with a second beveled crank gear coupled to said input shaft wherein an axis of said non-spinning hub means is parallel to the axis of said first hub shaft means and angled with respect to said input shaft.

5. The infinitely variable rotary transmission system of claim 1, wherein said transmission system provides a true infinitely variable speed range that begins with zero power output and accelerates smoothly and steplessly into an over-drive range, provides limitless horsepower capacity and does not require a clutch mechanism to change speeds.

6. The infinitely variable rotary transmission system of claim 1, wherein said transmission system can be either a manual transmission or an automatic transmission.

7. The infinitely variable rotary transmission system of claim 1, wherein a total resistance is a sum of all of said plurality of resistances provided by said plurality of cam rod means, simultaneously, operatively controls the rotation of said crank.

8. The infinitely variable rotary transmission system of claim 7, wherein when said total resistance is zero the rotational speed of the output shaft is zero and increasing said total resistance increases the rotational speed of said output shaft and decreasing said total resistance decreases the rotational speed of said output shaft.

9. An infinitely variable rotary drive transmission system for providing a true infinitely variable speed range that begins with zero power output and accelerates smoothly and steplessly into an overdrive range, and does not require a clutch mechanism to change speeds, said infinitely variable rotary drive transmission system comprising:
   (a) non-spinning hub means coupled to a plurality of radial arm means extending radially outward therefrom and equiangularly spaced thereon for controlling a crank rotation;
   (b) a crank roller means coupled to a crank rotates against an inner rim of said non-spinning hub means thereby controlling said crank rotation;
   (c) a plurality of cam rod means each pivotally coupled to a respective one of a plurality of gear means for providing a plurality of resistances; and,
   (d) a plurality of cam follower means each slidably coupled to a respective one of said plurality of cam rod means and pivotally coupled to a respective one of said plurality of radial arm means for controlling a slope of inclination for each of said respective one of said plurality cam rod means.

10. The infinitely variable rotary drive transmission system of claim 9, further comprising a plurality of support means for supporting said respective one of said plurality of radial arm means and for maintaining the original alignment of each of said plurality of radial arm means parallel to its original orientation, wherein each of said plurality of support means comprises:
   (i) a guide rod perpendicular to said respective one of said plurality of radial arm means;
   (ii) mounting block pairs coupled to distal ends of said guide rod;
   (iii) first guide slidably coupled to said guide rod; and,
   (iv) second guide rigidly coupled to said first guide and slidably couple to said respective one of said plurality of radial arm means.

11. The infinitely variable rotary drive transmission system of claim 9, wherein said non-spinning hub means is a hollowed ring shaped member having an input shaft pass therethrough and an axis of said non-spinning hub means is maintained at a constant radius, eccentric to and parallel to a longitudinal axis of said input shaft.

12. The infinitely variable rotary transmission system of claim 9 further comprising a plurality of differential gear assembly means spaced symmetrically about and concentric with an axis of an input shaft for controlling rotational speed of an output shaft, each of said plurality of differential gear assembly means comprises:
   (i) spider shaft having a rotational velocity;
   (ii) first combination gear means, having a rotational velocity, coupled to said spider shaft for determining a speed and torque;
   (iii) second combination gear means second rotatably coupled to said spider shaft means for receiving said speed and said torque via a differential beveled pinion gear pair; and, (iv) differential shaft means fixedly coupled to said spider shaft means wherein the axis of said differential shaft means perpendicularly bisects said spider shaft means, said differential shaft means orbits said differential beveled pinion gear pair so that said speed and said torque of said first combination gear means is transmitted to said second combination gear means.

13. The infinitely variable rotary transmission system of claim 9, wherein said transmission system can be either a manual transmission or an automatic transmission.

14. The infinitely variable rotary transmission system of claim 9, wherein a total resistance is a sum of all of said plurality of resistances provided by said plurality of cam rod means, simultaneously, operatively controls the rotation of said crank.

15. The infinitely variable rotary transmission system of claim 14, wherein when said resistance is zero the rotational speed of spider shaft means is zero and the rotational speed of the output shaft is zero and increasing said resistance increases the rotational speed of said output shaft and decreasing said resistance decreases the rotational speed of said output shaft.

16. An infinitely variable rotary drive transmission system comprising:

(a) non-spinning hub means coupled to a plurality of radial arm means extending radially outward therefrom and equiangularly spaced thereon for controlling a crank rotation;

(b) a crank roller means coupled to a crank rotates against an inner rim of said non-spinning hub, thereby controlling said crank rotation;

(c) a plurality of cam rod means for providing a plurality of resistances;

(d) a plurality of cam follower means each slidably coupled to a respective one of a plurality of cam rod means and pivotally coupled to a respective one of a plurality of radial arm means for transmitting said resistances to each of said respective one of said plurality of radial arm means; and, (e) cam rod adjustment assembly means for adjusting said slope of inclination for each of said plurality of cam rod means by equal amounts.

17. The infinitely variable rotary drive transmission system of claim 16, further comprising a plurality of support means for supporting said respective one of said plurality of radial arm means and for maintaining the original alignment of each of said plurality of radial arm means parallel to its original orientation, wherein each of said plurality of support means comprises:

(i) a guide rod perpendicular to said respective one of said plurality of radial arm means;

(ii) mounting block pairs coupled to distal ends of said guide rod;

(iii) first guide slidably coupled to said guide rod; and, (iv) second guide rigidly coupled to said first guide and slidably couple to said respective one of said plurality of radial arm means.

18. The infinitely variable rotary drive transmission system of claim 16, wherein said cam rod adjustment assembly means comprises:

(i) a plurality of end gear means each pivotally coupled to a respective one of said plurality of cam rod means;

(ii) worm gear;

(iii) worm gear shaft coupled to said worm gear;

(iv) cam rod adjustment gear operatively coupled to mesh with said plurality of end gear means; and, wherein rotation of said worm gear shaft causes said worm gear to turn said cam rod adjustment gear thereby turning said plurality of end gear means, accordingly as said plurality of end gear means turn said slope of inclination is adjusted.

19. The infinitely variable rotary transmission system of claim 16, further comprising a plurality of differential gear assembly means spaced symmetrically about and concentric with an axis of an input shaft for controlling rotational speed of an output shaft, each of said plurality of differential gear assembly means comprises:

(i) spider shaft having a rotational velocity;

(ii) spider shaft gear coupled to one end of said spider shaft;

(iii) first combination gear means, having a rotational velocity, coupled to end said spider shaft for determining a speed and torque;

(iv) second combination gear means second coupled to said spider shaft means for receiving said speed and said torque via a differential beveled pinion gear pair; and, (v) differential shaft means fixedly coupled to said spider shaft means wherein the axis of said differential shaft means perpendicularly bisects said spider shaft means, said differential shaft means orbits said differential beveled pinion gear pair so that said speed and said torque of said first combination gear means is transmitted to said second combination gear means.

20. The infinitely variable rotary transmission system of claim 19, further comprising:

drive crank gear for meshing with said spider shaft gear for spinning said spider shaft; and stationary ring gear concentric with the axis of said input shaft; and, wherein as said first combination gear means turns against said stationary ring gear, said spider shaft gear spins against said drive gear.

* * * * *